Oct. 9, 1928.
A. E. PAIGE
1,686,763.
VEHICLE LOCK AND ELECTRIC CIRCUITS
Filed March 24, 1924  3 Sheets-Sheet 1
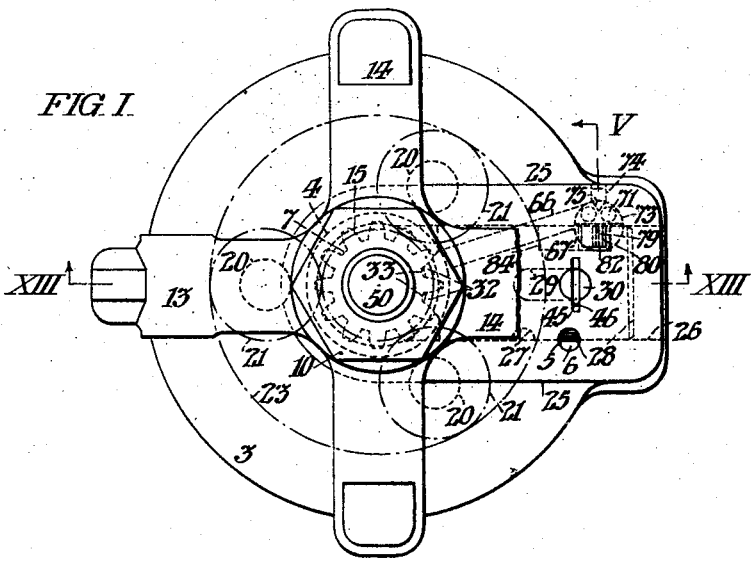
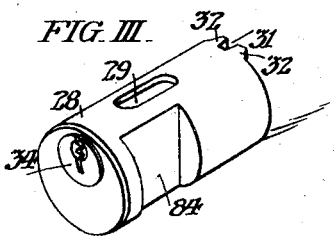
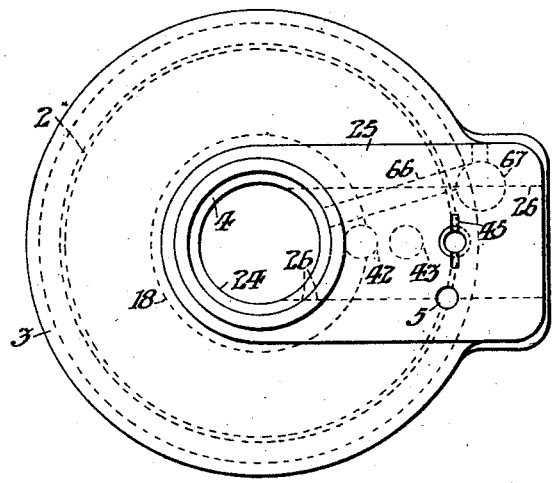
Inventor:
Arthur E. Paige.

Oct. 9, 1928.
A. E. PAIGE
1,686,763
VEHICLE LOCK AND ELECTRIC CIRCUITS
Filed March 24, 1924     3 Sheets-Sheet 2
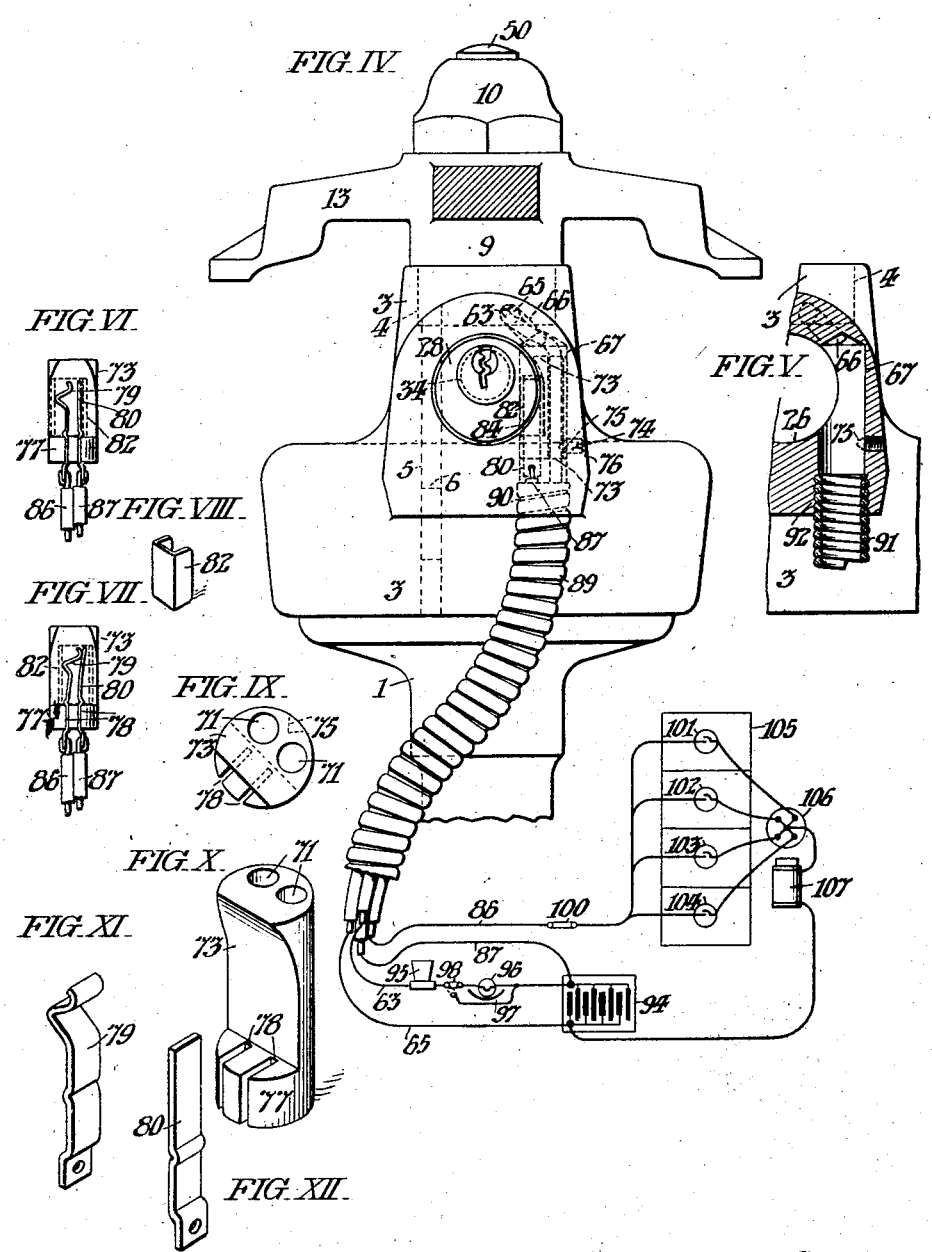
Inventor:
Arthur E. Paige

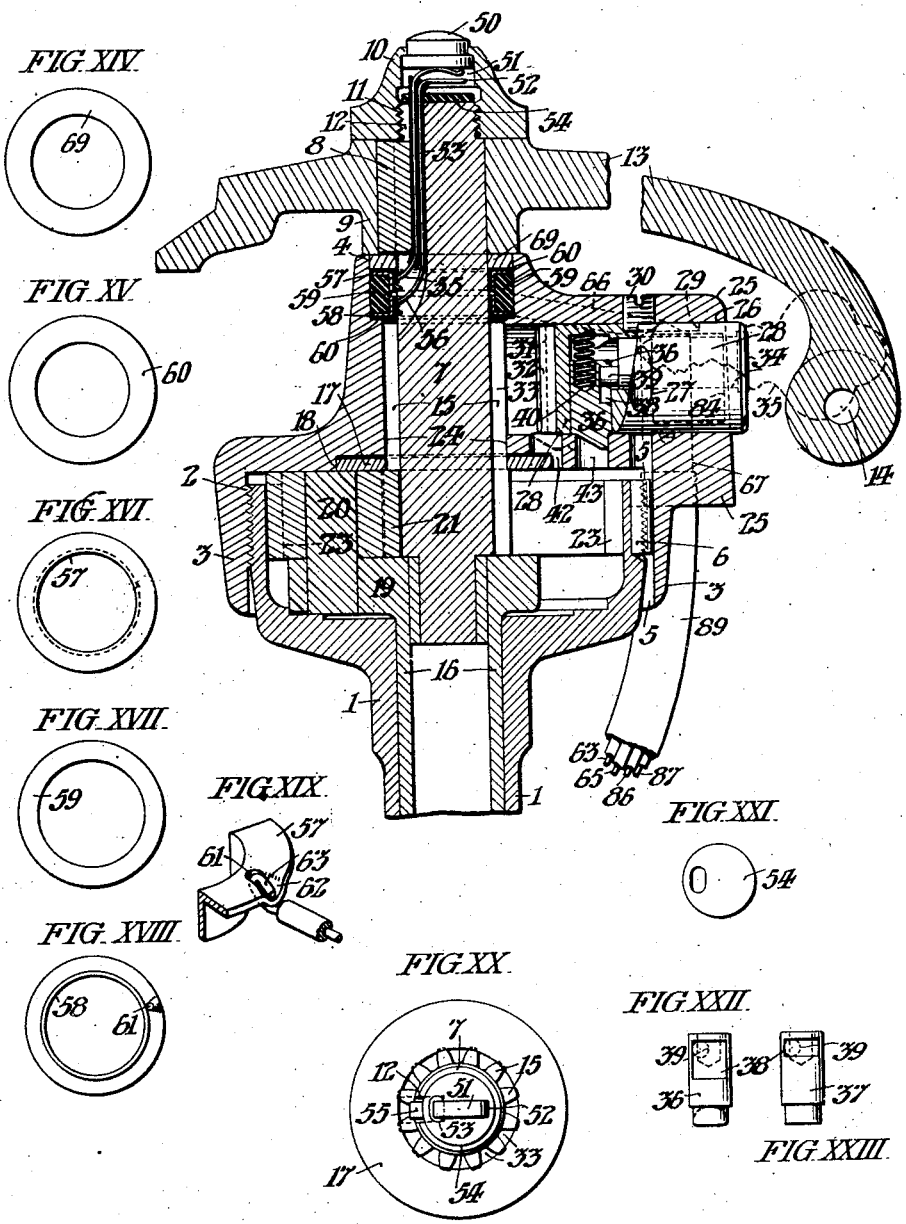

Patented Oct. 9, 1928.

1,686,763

UNITED STATES PATENT OFFICE.

ARTHUR E. PAIGE, OF PHILADELPHIA, PENNSYLVANIA.

VEHICLE LOCK AND ELECTRIC CIRCUITS.

Application filed March 24, 1924. Serial No. 701,597.

My improved locking device is particularly applicable to steering mechanism for automobile and other self-propelled vehicles, including a steering shaft having a rotary steering wheel and mounted to turn in a tubular column or post, and provides means for detachably rigidly connecting such a steering shaft with a steering column, so as to prevent the vehicle from being steered when locked, and means whereby an electric circuit controlling the operation of the vehicle is broken or otherwise modified when the vehicle is locked, so as to then prevent operation of the vehicle motor; also means whereby an electric circuit, for instance, that including the vehicle horn, is arranged to be controlled by a switch appliance carried by said steering shaft in coöperative relation with a terminal or terminals held stationary by said column.
The form of my invention chosen for illustration is particularly applicable to automobile mechanism of the "Ford" type, including a planetary train of gears of which the sun gear is carried by the steering shaft aforesaid. I have also found it convenient to employ locking mechanism including a lock body, of a pin key type, which is mounted to reciprocate radially in a casing formed in a screw cap which serves as a cover for the internal gear case which is a stationary fixture at the top of said steering column; said lock body being arranged to directly engage the steering shaft to prevent rotation of the latter when in locked position. Said lock body may be manually thrust into such locking position without the employment of its key; the latter being required only to release and effect the withdrawal of the lock body from its locked position. An electric controlling circuit, preferably the ignition circuit, includes a switch so mounted in said lock casing that the circuit is opened at said switch whenever said lock body is shifted to its locked position, in which the steering mechanism is inoperative; but is automatically closed when said lock body is withdrawn to release the steering mechanism. In other words; the construction and arrangement of my invention are such as to simultaneously control both the mechanical and the electrical operating mechanism of the vehicle to prevent the operation thereof when locked and permit such operation when unlocked.
Moreover, in electric signaling systems of the prior art, a push button switch is carried by the steering wheel and connected with the other parts of the system by flexible wires secured at one end upon the steering wheel and at the other end upon some stationary part of the vehicle; necessitating the provision of a considerable extent of such wires so disposed that they may be coiled or uncoiled, or otherwise flexed, with every movement of the steering wheel, throughout the complete rotation of the latter in either direction with reference to said stationary column. Such wires are unsightly and inconvenient in that they extend in such position that they must be continually avoided by the operator, and repeated flexure thereof tends to loosen their connections and render them inoperative. Therefore, a purpose and effect of my invention are to provide a construction and arrangement avoiding the necessity for such flexible conductors between the rotary steering wheel and the stationary steering column, and to provide means to otherwise effect the desired electric connections. In the form of my invention hereinafter described, all of the parts of the electric circuits which are movable by the steering wheel are in fact carried by the steering shaft, independently of the wheel, so that the latter may be removed and replaced without disturbing them. As hereinafter described; said shaft carries a pair of push switch terminals at the upper end thereof in unitary connection with conductors extending downwardly in a slot in the circumference of a steering shaft which also serves as a seat for the spline key whereby the shaft is connected to the steering wheel, and the lower end of said switch conductors project laterally as brush contacts which are maintained in continuous sliding engagement with respective terminal rings held stationary in said column cap and respectively provided with conductors extending therefrom and included in the circuit in the vehicle comprising a storage battery or other source of electric energy.

My invention includes the various novel features of construction and arrangement hereinafter more definitely specified. However, vehicle locks and signaling devices of the general character herein disclosed are claimed in my copending application Serial No. 688,819.

In said drawings: Fig. I is a fragmentary plan view of a steering wheel spider and appurtenant mechanism conveniently embodying my invention; the arm of the spider extending to the right being broken off. Fig. II is a plan view of the steering column cap partly shown in Fig. I. Fig. III is a perspective view of the lock body shown in dotted lines in Fig. I, which is radially reciprocatory in said cap. Fig. IV is a fragmentary elevation of the right hand side of the mechanism shown in Fig. I; which is conveniently the right hand side of the steering column cap as it is held stationary in the vehicle, and a wiring diagram including a typical electric ignition circuit and a typical vehicle signaling circuit, indicating the relation of the same to the switch mechanism aforesaid. Fig. V is a fragmentary sectional view taken on the line V in Fig. I, but showing a modified form of flexible armored conduit for the electric conductors extending from said column cap. Fig. VI is an elevation of the left hand side of the switch indicated in dotted lines in Fig. IV, opened, to break the ignition circuit, by shifting the lock body to locked position. Fig. VII is an elevation corresponding to Fig. VI but with the switch closed by withdrawing said lock body to unlocked position. Fig. VIII is a perspective view of the insulating push member indicated in dotted lines in Figs. VI and VII. Fig. IX is a plan view of the cylindriform insulating support of the switch shown in Figs. VI and VII, but on a larger scale; the preceding figures showing the full size of the structure. Fig. X is a perspective view of said switch insulating support, on the same scale as Fig. IX. Figs. XI and XII are respective perspective views of the two switch terminals shown at the left and right in Figs. VI and VII, but on the scale of Figs. IX and X. Fig. XIII is a diametrical sectional view of the structure shown in Fig. I, taken on the line XIII, XIII. Fig. XIV is a plan view of the steel bearing ring which is push fitted in said cap as indicated in Fig. XIII. Fig. XV is a plan view of one of the two thin plane insulating washers shown in section in Fig. XIII. Fig. XVI is a plan view of the upper stationary contact ring shown in section in Fig. XIII. Fig. XVII is a plan view of the insulating tube which supports the two contact rings in spaced relation as shown in section in Fig. XIII. Fig. XVIII is a plan view of the lower contact ring shown in section in Fig. XIII. Fig. XIX is a fragmentary perspective view of the upper contact ring shown in Fig. XVI, but on a larger scale, showing how the electric conductors are connected with said rings. Fig. XX is a detached plan view of the steering shaft and its appurtenances shown in Fig. XIII. Fig. XXI is a plan view of the insulating disk shown in section at the top of said steering shaft shown in Fig. XIII. Fig. XXII is an elevation of the transversely reciprocatory spring pressed detent plunger which normally extends transversely from said lock body, as indicated in Fig. XIII. Fig. XXIII is an elevation of a modified form of locking plunger, similar to that shown in section in Fig. XIII, but so constructed and arranged that the key must be employed in connection therewith, both to fit the radially reciprocatory lock body in locked position and to withdraw it therefrom.

In said figures; the stationary steering column 1 is provided with the external screw thread 2 adapted to be engaged by the stationary column head cover or cap 3. Said cap has the circular recess 4 at its upper end to hold the electric contact rings shown in section in Fig. XIII, and as hereinafter described. Said cap 3 has the key socket 5 adapted to receive a cylindrical key 6 which is driven downward therein across said screw thread 2, to normally prevent said cap from being unscrewed from said column, but which may be driven upward and out as hereinafter described. The steering shaft 7 is mounted to rotate in said column 1 and is operatively connected, by the spline key 8, with the steering wheel hub 9 which is detachably secured on said shaft by the nut 10 engaging the screw thread 11 at the upper end of said shaft. As shown in Fig. XIII; said key 8 extends in the radial slot 12 in said shaft 7. Said steering wheel conveniently includes the spider 13 extending from said hub 9, and either rigidly or pivotally connected to an annular steering wheel rim; the arm extending to the right in Fig. I, but broken off, being provided at its outer end with a pivotal connection 14 for a tiltable form of steering wheel, as shown in Fig. XIII.

Said steering shaft 7, known to the trade as the "drive pinion shaft" has, in unitary relation therewith, the pinion teeth 15 forming the "sun" gear of the planetary train. Said shaft 7 is journaled at its lower end in the drive pinion shaft bushing 16 which is rotatable in said column 1 and is held downward therein by the stop flange 17, which is drive fitted around said shaft 7, and extends in a complementary recess 18 in said cap 3, as shown in Fig. XIII. Said bushing 16 has, at its upper end, the three arms 19 carrying respective stud shafts 20, parallel with said shaft 7. The planetary pinions 21 are mounted to turn upon said stud shafts 20 in mesh with said pinion teeth 15 and in mesh with the internal orbital gear 23, which latter is formed in unitary relation with said column 1.

Said internal gear case cover or cap 3 has the axial bore 24 concentric with the axis of said shaft 7 and fitted to the slightly reduced circumference of said pinion teeth 15 extending above said stop flange ring 17; so that said shaft is thus journaled in said cover 3.

Said internal gear case cap 3 also has, in unitary relation therewith, the lock casing 25 with the radial cylindrical lock socket 26 with which said pinion teeth 15 are adapted to successively register in every rotary position of said shaft 7. The locking device includes the primarily separate cylindrical body 28 fitted to reciprocate in said lock socket 26; the extent of its reciprocation being limited by the slot 29 in its top in which the screw 30 extends in rigid relation with said lock casing 25. Said body 28 has the segmental groove 27 in its perimeter arranged to register with said cap key seat 5, when said lock body 28 is withdrawn to unlocked position, shown in Fig. XIII, so that said key 6 may then be driven downward into the position shown in Fig. II or may be driven upward and outward from that position. However, when said locking device is in its locking position shown in Fig. I, said body 28 prevents removal of said cap key 6.

As shown in Figs. I and III; the inner end of said lock body 28 is grooved at 31, and has two teeth or ridges 32 fitted to engage anywhere in the circumferential series of locking recesses 33 between said pinion teeth 15 which are in unitary relation with said shaft 7. The rotation of said shaft 7 is thus prevented when said lock body is engaged therewith as indicated in dotted lines in Fig. I; thus preventing operation of the steering mechanism which is connected to the lower end of said bushing 16.

Said lock 28 has pin tumblers extending radially in the thickest part of its wall around the cylindrical bore formed eccentric to but parallel with its axis, for the rotary key barrel 34; which barrel is rotatable by the removable key 35, to retract the detent or locking plunger 36 shown in Fig. XIII; or to both project and retract the modified form of plunger 37, shown in Fig. XXIII. Said lock body 28 has a transverse, diametrical bore for either of said plungers, intersecting the axes of said body and said barrel 34. Said plungers 36 and 37 differ, first, in the axial extent of the transverse, segmental, crank notch 38 therein which is adapted to receive the crank 39 projecting from the inner end of said rotary key barrel 34 and, second, in that the lower end of the plunger 36 is cam inclined as indicated in Fig. XIII, whereas, the lower end of the plunger 36 is not. Each such plunger has a cylindrical spring seat, eccentric to the plunger axis, so as to clear its notch 38 and hold a spring 40 tending to project the plunger. Either plunger 36 or 37 is thus adapted for alternate engagement in the detent recesses 42 and 43 in said cap 3, to detain said lock body 28 in either its inner locked position shown in Fig. I or in its outer unlocked position shown in Fig. XIII.

When said key 35 is turned to retract the detent plunger 36 from the detent recess 42, and the lock body 28 is withdrawn, from the position shown in Fig. I to the position shown in Fig. XIII to the limit of its slot 29, said plunger 36 registers with said recess 43 and is automatically thrust therein, by said spring 40, to hold said lock body 28 out of engagement with said steering shaft 7 and thus permit the vehicle to be steered. Although in such unlocked position, said detent plunger 36 is spring pressed into said detent recess 43 enough to prevent the accidental inward movement of said lock body 28 to locked position; said body may be thrust inward, by the finger or thumb of the operator, without using said key 35; such movement of the lock body merely causing the lower cam inclined end of said plunger 36 to ride over the inner edge of the recess 43 and be thus thrust upward into said body 28, against the pressure of said spring 40, until said plunger 36 registers with the detent recess 42 into which it is automatically thrust by said spring, to the position shown in dotted lines in Fig. XIII, to detain said lock body 28 in the locked position indicated in dotted lines in Fig. I.

It may be observed that the lower end of said plunger 36 is of less diameter than its upper portion so as to form a shoulder which is pressed by said spring 40 against the metal of said cap 3 so as to prevent said lock body 28 from rattling therein under any circumstances.

Said key 35 may be withdrawn from said lock 28 whenever the plunger 36 or 37 is projected, but cannot be withdrawn from said lock when the plunger is retracted into the lock body and, consequently, said key 35 serves as a handle by which said lock body 28 may be reciprocated. Of course, when said screw 30 is withdrawn from said slot 29, said lock body 28 may be withdrawn from its casing 25 and said cover 3; being thus separable as shown in Fig. III. However, in the ordinary use of this form of my invention, said screw 30 remains in the position shown in Figs. I and XIII, and said lock 28 is continuously carried in said cover 3 which, as above described, is stationary in the automobile, its rotation and removal from the column 1 being normally prevented by the key 6 aforesaid. In order to prevent accidental dislodgment of said screw 30 from the position shown in the drawings; I prefer to provide a transverse slot 45 in the upper surface of said lock casing 25 with which the slot in said screw 30 is adapted to be registered as shown in Figs. I and II and to slightly project the metal of said screw 30 into engagement with said casing 25 in said slot 45, as indicated at 46 in Fig. I, by striking the top of said screw with a center punch. However, such projection of the metal of the screw is not sufficient to prevent its forcible operation by a screw driver.

Said nut 10 has an axial bore in which the push button 50, which is formed of insulating material, is mounted to reciprocate, but said button is normally upheld in the position shown in Fig. XIII by the spring terminal 51 which is held together with the spring terminal 52 in the insulating covering 53 and disk 54. Said spring switch terminals 51 and 52 are respectively in unitary relation with conducting members which extend in said spline key seat 12 parallel with the axis of said shaft 7, and have at their lower ends respective spring contact brushes 55 and 56. Said contact brushes 55 and 56 are continuously in respective sliding contact with the stationary contact rings 57 and 58 which are separated and supported in axially spaced relation by the insulating tube 59 shown in section in Fig. XIII and in plan in Fig. XVII. Said contact rings 57 and 58 are insulated from said cap 3 by two similar thin plane insulating washers 60, which are shown in section in Fig. XIII extending respectively above the upper contact ring 57 and below the lower contact ring 58, and one of which is shown in plan in Fig. XV.

Said contact rings 57 and 58 are precisely alike but merely axially oppositely disposed. Each has a perforation 61 in its plane flange, as indicated in Figs. XVI and XVIII, and said plane flanges are distorted axially at said perforations 61 as indicated at 62 in Fig. XIX, to form respective recesses in which the ends of electric conductors may be clinched in electric connection with the respective rings, as exemplified by the conductor 63 shown in Fig. XIX.

Said contact rings 57 and 58, shown in section in Fig. XIII, are respectively provided with electric conductors 63 and 65 which extend through the drilled passageway 66 in said cap 3 from said recess 4 to the switch socket 67 which is conveniently formed by drilling said cap 3 parallel with its axial bore 24.

Said rings 57 and 58 and the insulating elements supporting and separating them from the metal of both said cap 3 and the steering shaft 7 are held in stationary position in said cap by drive fitting, in the upper end of said recess 4, the steel bearing ring 69, shown in section in Fig. XIII and in plan in Fig. XIV. Said conductors 63 and 65 extend from said passage 66 downward through said switch socket 67 in respective ducts 71 in the cylindriform insulating switch support 73 which is normally held stationary in said socket 67 by the set screw 74, engaging the conical seat 75 in said support. Accidental removal of said set screw may be prevented by distorting the metal of the cap 3 surrounding it at the outer end thereof, as indicated at 76 in Fig. IV.

As best shown in Fig. X; said switch support 73 has, in its cylindrical base 77, two parallel slots 78 to hold the two resilient metal switch terminals 79 and 80 which are offset above and below said base 77 so as to prevent their longitudinal displacement. Said switch terminals 79 and 80 are encased by the insulating push piece 82, indicated in dotted lines in Figs. I, VI and VII and shown detached in Fig. VIII. As shown in Figs. I and IV; said switch members 79 and 80 and their encasing push piece 82 project in the segmental notch 84 in said lock body 28, which is so proportioned that when said lock body is thrust inward to locking position, as shown in Fig. I, said switch members are permitted to separate as indicated in Fig. VI, to open the ignition circuit or other circuit controlling the operation of the vehicle motor and, when said lock body 28 is withdrawn to the locked position shown in Fig. XIII; said switch members are closed in contact, as shown in Fig. VII, thus closing said ignition circuit with which said terminals 79 and 80 are respectively connected by the conductors 86 and 87.

As indicated in Figs. I and IV; when said lock body 28 is thrust inward into locked position, the cylindrical portion thereof at the outer end of said notch 84 extends beneath the overhanging upper end of said switch base 73 so that the latter cannot then be withdrawn even if the screw 74 which normally holds it stationary be removed. That is to say; the locking mechanism above described also locks said motor controlling switch device, carried by said support 73, against unauthorized removal. Moreover, I prefer to protect the electric conductors aforesaid and particularly the conductors 86 and 87 by extending them through a flexible steel tube 89 which extends from the column cap 3 into the steel sheath around the steering column with which Ford automobiles are ordinarily provided to protect the wires leading to the horn button which, in the Ford structure, is mounted on such sheath. As indicated in Fig. IV, said protecting tube 89 is of an ordinary commercial form known as "armor tube", composed of helically wound overlapped steel strips, and it is to be understood that the lower end of said switch socket 67 in the column cap 3 is screw threaded at 90 to engage said tube 89 as a screw. However, in the modified form shown in Fig. V, a protecting tube 91 is formed of hardened steel wire in the form of a close wound spring which is similarly engaged as a screw, with the threads 92 cut in the cap 3 at the lower end of said switch socket 67. In either case; the conductors 63, 65, 86 and 87 may be drawn through said socket 67 and the armor tube 89 or 91, while the latter is straight, in which position such tubes may be freely screwed into or out of connection with said threads in the cap 3. However, after the parts are thus assembled and said tubes 89 or 91 flexed into the position they are intended to occupy in the vehicle; it is impossible to rotate them to unscrew them and, of course, they are difficult to cut and, therefore, protect the electric conductors within them from felonious or unauthorized disturbance.

As indicated in Fig. IV, the conductors 63 and 65 extending from the switch controlled by the push button 50, are connected with a source of electric energy in the vehicle, indicated as a storage battery 94, and may include either an audible signaling device, indicated as a horn 95, or a visible signaling device, indicated as an incandescent electric lamp 96 provided with a reflector 97, or may be arranged to operate both in accordance with the position of the switch 98 shown in Fig. IV. However, it is to be understood that said switch mechanism carried by the steering shaft 7 and operative by the push button 50, may be used to control an electric circuit of any kind.

In Fig. IV, I have shown said conductors 86 and 87, which lead from the switch mounted on said support 73, included in an ignition circuit with the same storage battery 94. That circuit may include an ordinary ignition switch, indicated at 100 in Fig. IV, conveniently connected with said conductor 86 and leading to terminals in the respective spark plugs 101, 102, 103 and 104 in a four cylinder engine indicated at 105. The opposite terminals of said spark plugs are connected with a distributor 106 and the latter included in circuit with the spark coil 107 and connected through said batery 94, to said conductor 87. However, it is to be understood that said motor controlling circuit shown in Fig. IV is merely typical of any circuit, the modification of which will determine whether the electrical controlling circuit of the vehicle motor shall be operative or not, and that the wiring diagram included in Fig. IV is not intended to be a complete illustration of the electrical equipment of any commercial vehicle. For instance, it is the common practice to include a generator in such equipment so connected as to charge the storage battery when the vehicle motor is running, and automatic switch mechanism to alternately connect such storage battery and generator with the spark plugs etc.

Furthermore, although I have shown the motor controlling switch device comprising the terminals 79 and 80 arranged to break an electric circuit when the lock body 28 is thrust into locking position and to complete or close the circuit when said lock body is withdrawn to unlocked position; it is obvious that such relation may be reversed. For instance, if the motor controlling system includes a magneto, such switch mechanism may be used to close a circuit, short-circuiting the magneto and thus prevent its use to start the vehicle motor, when the vehicle steering mechanism is locked, as above described. However, it is, of course, undesirable to short-circuit a storage battery. In other words; the specific construction and arrangement of the electric systems in which my lockable switch mechanism above described may be included, may be of any desired character.

Therefore, I do not desire to limit myself to the precise details of construction and arrangement herein set forth as it is obvious that various modifications may be made therein, without departing from the essential features of my invention, as defined in the appended claims.

I claim:

1. The combination with a stationary steering column; of a rotary shaft journaled in said column and having a circular series of locking recesses; a cover for said column, having a lock casing socket with which said locking recesses are adapted to successively register when said shaft is turned; a key lock including a body fitted to said casing socket and radially reciprocatory to engage said shaft to prevent steering movement of said shaft, and to release said shaft; said body having a notch in its perimeter; an electric switch comprising a movable member extending in said notch and arranged to be moved to operate said switch by the reciprocatory movement of said lock body; a motor for said vehicle; and an electric circuit including said switch arranged to control the operation of said motor; whereby, when said body is positioned to lock said shaft from turning, it shifts said switch to prevent operation of said motor, and when said body is positioned to permit operation of said shaft to steer the vehicle, it shifts said switch to permit operation of said motor; whereby an electric circuit may be maintained from a stationary portion of the vehicle to the rotary steering wheel thereof, despite rotation of the latter.

2. The combination with a stationary steering column; of a rotary shaft journaled in said column and having a circular series of locking recesses; a cap for said column, having a lock casing socket with which said locking recesses are adapted to successively register when said shaft is turned; a key lock including a body fitted to said casing socket and radially reciprocatory, with the key thereof, to engage said shaft to prevent steering movement of said shaft, and to release said shaft; whereby, said cap holds said lock in inseparable relation with said shaft when in locked position; said radially reciprocatory body having a notch in its perimeter; an electric switch comprising a movable member extending in said notch and arranged to be moved to operate said switch by the reciprocatory movement of said lock body, radially with respect to said shaft; and an electric circuit including said switch arranged to control the operation of said vehicle; whereby, when said body is positioned to lock said shaft from turning, it shifts said switch to prevent operation of said vehicle, and when said body is positioned to permit operation of said shaft to steer the vehicle, it shifts said switch to permit operation of said vehicle.

3. In a motor vehicle, the combination with a stationary steering column; of a cap for said column; a steering shaft journaled in said column and cap; an electric switch mounted in said cap; and locking means, mounted in said cap, and movable to contemporaneously prevent said shaft from turning and move said switch to prevent the vehicle motor from operating, having means arranged to hold it in inseparable relation with said column when locked.

In testimony whereof, I have hereunto signed my name at Philadelphia, Pennsylvania, this twenty-first day of March, 1924.

ARTHUR E. PAIGE.